United States Patent
Hies et al.

(10) Patent No.: US 7,333,510 B1
(45) Date of Patent: Feb. 19, 2008

(54) METHOD AND APPARATUS FOR PROVIDING IPV6 NETWORKS TO COMMUNICATE WITH OVERLAPPING IPV4 NETWORKS USING NAT-PT

(75) Inventors: Markus G. Hies, Wiesbaden (DE); Senthil M. Sivakumar, Sunnyvale, CA (US); Suresh K. Satapati, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1274 days.

(21) Appl. No.: 10/194,608

(22) Filed: Jul. 12, 2002

(51) Int. Cl.
*H04L 12/56* (2006.01)
(52) U.S. Cl. .................. 370/467; 370/401; 709/230
(58) Field of Classification Search ............... 370/352, 370/392, 401, 466, 467, 390, 329, 400, 389; 725/119; 713/160; 709/230–237
See application file for complete search history.

(56) References Cited

U.S. PATENT DOCUMENTS

| 7,085,270 B2 * | 8/2006 | Inouchi et al. ............. 370/392 |
| 2003/0106067 A1 * | 6/2003 | Hoskins et al. ............. 725/119 |
| 2006/0259949 A1 * | 11/2006 | Schaefer et al. ............. 726/1 |

OTHER PUBLICATIONS

E. Nordmark (Sun Microsystems), "Stateless IP/ICMP Translation Algorithm (SIIT)", Feb. 2000, The Internet Society (2000), 25 pages.
G. Tsirtsis and P. Srisuresh (Campio Communications), "Network Address Translation—Protocol Translation (NAT-PT)", Feb. 2000, The Internet Society (2000), 20 pages.
U.S. Appl. No. 09/920,533, entitled "Mechanisms for Avoiding Problems Associated with Network Address Protocol Translation", by Inventor Daniel C. Biederman, filed Jul. 31, 2001.

* cited by examiner

*Primary Examiner*—John Pezzlo
(74) *Attorney, Agent, or Firm*—Beyer Weaver LLP

(57) ABSTRACT

A method for providing handling of data sent between a first network and at least a second network and a third network, wherein the first network is of a first protocol and the at least second and third networks are of a second protocol at least partially overlap is provided. A packet transmitted from the first network is received. The packet has a first address prefix if the packet is directed to the second network and has a second address prefix if the packet is directed to the third network. A destination address of the packet and a source address of the packet are translated from the first protocol to the second protocol. The packet is directed to the second network if the packet has the first address prefix. The packet is directed to the third network if the packet has the second address prefix.

23 Claims, 5 Drawing Sheets

METHOD AND APPARATUS FOR PROVIDING IPV6 NETWORKS TO COMMUNICATE WITH OVERLAPPING IPV4 NETWORKS USING NAT-PT

BACKGROUND OF THE INVENTION

The present invention relates to methods and apparatus for processing data within a computer network. More specifically, this invention relates to performing network address translation on data.

In a network, devices on the network are provided network addresses, which are used to identify the different devices, when devices communicate between each other. IP protocol version 4 (IPv4) is a protocol used to provide addresses for public and private networks. A private network, such as an enterprise system, may be connected to a public network, such as the Internet. Such private networks may have more devices than available Internet IPv4 addresses allocated to the private network. In such a situation, a network address translator (NAT) may be connected between the private network and the Internet. The NAT may dynamically assign IPv4 addresses, so that the number of devices using the Internet at one time is limited to the available number of IPv4 addresses allocated to the private network. In the alternative, the NAT may use port address translation, where port numbers are used to further identify different devices to provide multiplexing on the port.

IPv4 uses a 32 bit address. Even with these various multiplexing methods to allow multiple devices for each Internet IPv4 address the number of devices that are desired to be connected to the Internet will exceed the limits of a 32 bit address. IPv6 is a protocol that is designed to replace IPv4. IPv6 provides for a 128 bit address and helps to fix problems caused by IPv4. Because a large number of devices and routers using IPv4 are in existence, IPv6 should replace IPv4 gradually, instead of instantaneously. As a result, networks using IPv6 need to be able to communicate with networks using IPv4.

RFC 2765 entitled, "Stateless IP/ICMP Translation Algorithm (SIIT)" and RFC 2766 entitled, "Network Address Translation—Protocol Translation (NAT-PT)", which are incorporated by reference, provide standards for a network address translator and protocol translator (NAT-PT), which allows an IPv6 network to communicate with an IPv4 network. FIG. 1 is a schematic illustration of a system 100 that allows an IPv6 network 102 to communicate with an IPv4 network 104 under RFC 2765 and RFC 2766. Under RFC 2765 and RFC 2766 a NAT-PT 106 is assigned an address prefix. In this example, the prefix for the NAT-PT 106 is "2001". In operation, for a device in the IPv6 network to send data to a device in the IPv4 network, a prefix of 2001 is added to the destination address. For example, if a device on the IPv6 network is sending data to a device on the IPv4 network with an address 1.1.1.1, added prefix would cause the destination address to be 2001:0101:0101.

If two overlapping IPv4 networks were connected to the NAT-PT, when data is sent to overlapping addresses, the NAT-PT would be unable to determine which device should receive the data.

SUMMARY OF THE INVENTION

To achieve the foregoing, and in accordance with the purpose of the present invention, a method for providing transparent handling of data sent between a first network and at least a second network and a third network, wherein the first network is of a first protocol and the at least second and third networks are of a second protocol and wherein the second and third networks at least partially overlap. A packet transmitted from the first network to one of the at least second and third networks is received. The packet has a first address prefix of the first protocol if the packet is directed to the second network and has a second address prefix of the first protocol if the packet is directed to the third network. A destination address of the packet and a source address of the packet are translated from the first protocol to the second protocol. The packet is directed to the second network if the packet has the first address prefix of the first protocol. The packet is directed to the third network if the packet has the second address prefix of the first protocol.

In another embodiment, the invention provides a method for providing transparent handling of data sent between an IPv6 network and at least a first IPv4 network and a second IPv4 network, where the first and second IPv4 networks at least partially overlap. A packet transmitted from the IPv6 network to one of the first and second IPv4 networks is received, where the packet has a first IPv6 address prefix if the packet is directed to the second network and has a second IPv6 address prefix if the packet is directed to the second IPv4 network. A destination address of the packet and a source address of the packet are translated from an IPv6 protocol to an IPv4 protocol. The packet is directed to the first IPv4 network if the packet has the first IPv6 prefix. The packet is directed to the second IPv4 network if the packet has the second IPv6 prefix.

In another embodiment of the invention, the invention pertains to a computer system operable for providing transparent handling of data sent between a first network and at least a second network and a third network, where the first network is of a first protocol and the at least second and third networks are of a second protocol and wherein the second and third networks at least partially overlap. The computer system includes one or more processors and one or more memory. At least one of the memory processors are adapted to provide at least some of the above described method operations. In yet a further embodiment of the invention, the invention pertains to a computer program product for providing transparent handling of data sent between a first network and at least a second network and a third network, where the first network is of a first protocol and the at least second and third networks are of a second protocol and wherein the second and third networks at least partially overlap. The computer program product has at least one computer readable medium and computer program instructions stored within at least one of the computer readable product configured to perform at least some of the described method operations. In yet another embodiment, the invention pertains to an apparatus that includes one or more means for performing the above described method operations.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
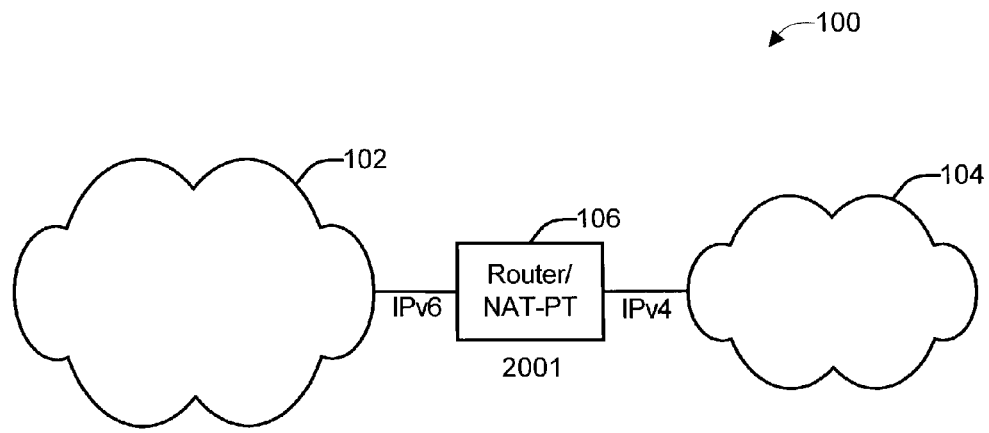
FIG. 1 is a schematic illustration of a system that allows an IPv6 network to communicate with a network in the prior art.
Figure 2:
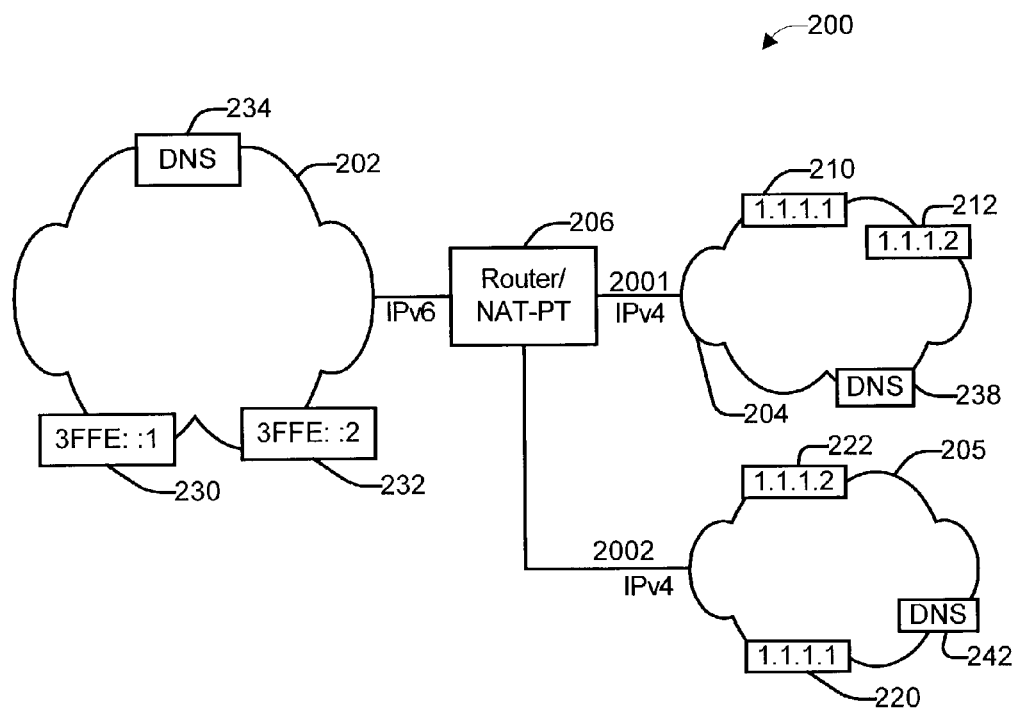
FIG. 2 is a schematic illustration of a system that allows a first network of a first protocol to communicate with at least a second network and a third network, wherein the second and third networks are of a second protocol and at least partially overlap.

To facilitate understanding, FIG. 2 is a schematic illustration of a system 200 that allows a first network 202 of a first protocol, such as IPv6, to communicate with at least a second network 204 and a third network 205, wherein the second and third networks 204, 205 are of a second protocol, such as IPv4, and at least partially overlap.

Overlapping networks are networks with devices with the same address. For example, the second network 204 has a first device 210 with an address 1.1.1.1 and the third network 205 has a first device 220 with an address 1.1.1.1, making the second network 204 and the third network 205 overlapping. Such overlapping may result from the use of private networks with overlapping addresses or the lack of sufficient network addresses. Such overlapping of addresses may be common in large enterprise systems and service providers. Two separate private networks may have overlapping addresses because such networks may never need to exchange packets. Sometimes it is desirable to merge such networks, such as when companies that own the networks merge, but the overlapping addresses may prevent such a merging. The ability of the invention to accommodate overlapping networks helps to solve this problem.

The first network 202 may have other devices such as a second device 232, with an address of 3FFE: :2. The second network may have other devices such as a second device 212, with a network address of 1.1.1.2. The third network may have other devices such as a second device 222, with a network address of 1.1.1.2. These devices 210, 212, 220, 222, 230, 232 may be combinations of client devices, server devices, and other computer network devices.

A router/NAT-PT 206 is connected between the first network 202, the second network 204, and the third network 205. In an example of an embodiment of the invention, the second network 204 is assigned an IPv6 prefix of 2001 and the third network 205 is assigned an IPv6 prefix of 2002. Instead of assigning the NAT-PT 206 a prefix, each of the overlapping IPv4 networks 204, 205 is assigned a prefix. The first network, second network, and third network may be public networks or private networks, or various combinations of public and private networks.

In operation, the device 230 on the first network 202 has an IPv6 address of 3FFE:100:AABB:CCCC:DDD:EEEE: FFFF:1, which is abbreviated as 3FFE: :1. The device 230 on the first network sends a request for service to a domain name. The request is sent from the device 230 on the first network to a domain name service (DNS) 234 on the first network 202. If the DNS on the first network 202 does not recognize the domain name, the request is sent from the DNS 234 on the first network 202 to other DNS's, such as the DNS 238 on the second network 204, and the DNS 242 on the third network 205. In this example, the DNS 242 on the third network 205 recognizes the requested domain name as being the first device 220 on the third network 205. The DNS 242 on the third network 205 sends a reply providing the IPv4 address of the first device 220 on the third network 205. The NAT-PT 206 translates the network address provided by the DNS 242. Since the address is on the third network, the NAT-PT 206 adds a prefix of 2002 in front of the address for the first device 220 on the third network. The message is then forwarded to the device 230 on the first network with the translated address.

Figure 3:
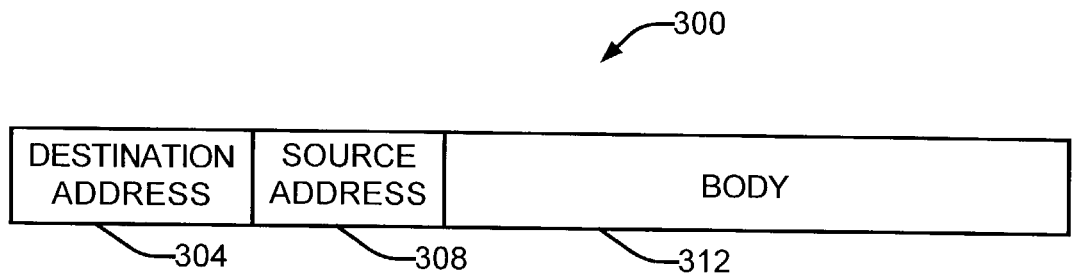
FIG. 3 is a schematic view of an IP packet.

FIG. 3 is a schematic view of an IP packet 300. Such an IP packet 300 has a header with a destination address 304 and a source address 308. The IP packet 300 also has a body 312.

Figure 4:
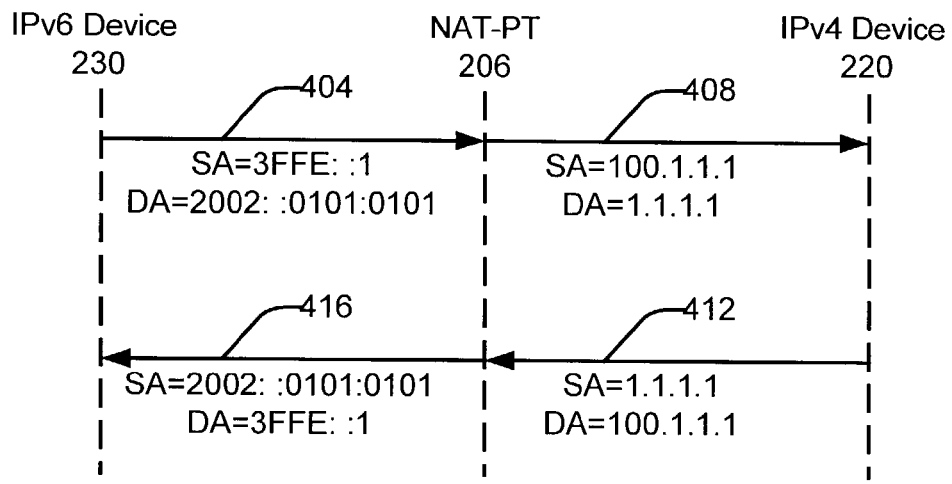
FIG. 4 is a schematic illustration of the IP packets sent during an exchange of IP packets between a device on the first network and a device on the third network.
Figure 7:
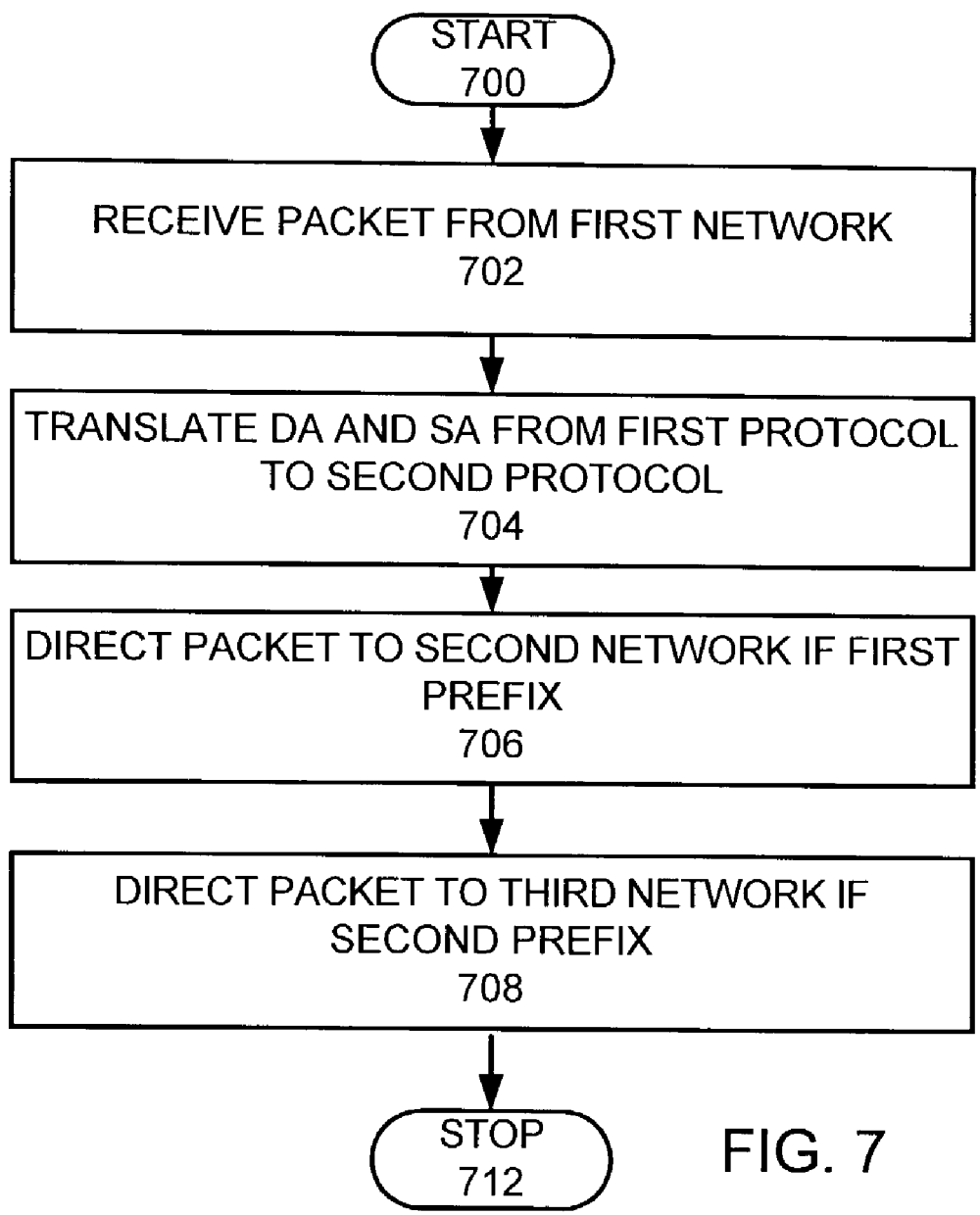
FIG. 7 is a flow chart of the processing of a packet received from the first network.

FIG. 4 is a schematic illustration of the IP packets sent during an exchange of IP packets between the device 230 on the first network 202 and the first device 220 on the third network 205. The device 230 on the first network 202 sends a first IP packet 404, which is passed to the NAT-PT 206. The source address is 3FFE: :1, and the destination address is 2002: :0101:0101, which is the prefix "2002" added to the hexadecimal equivalent of 1.1.1.1. FIG. 7 is a flow chart of the processing of the packet by the NAT-PT. The NAT-PT 206 receives the first packet from the device 230 on the first network 202 (step 702). The NAT-PT 206 translates the source address of 3FFE: :1 and destination address of 2002: :0101:0101 of the first packet from IPv6 to IPv4 resulting in a source address of 100.1.1.1 and destination address of 1.1.1.1 (step 704). Since the destination address of the first packet had a prefix of 2002, the NAT-PT knows that the translated packet is to be directed to the third network 205 (step 708). Part of this translation is performed by converting hexadecimal addresses to decimal addresses. The translated first packet 408 goes to the first device 220, which has the address of 1.1.1.1 on the third network. The NAT-PT 206 may have a look up table that indicates that devices on the first network have "100" as the first number in the IPv4 format address and that IPv6 format address with a prefix of 2002 indicates the third network 205 or may use other methods of providing the translation. The resulting translated first packet 408 has source and destination addresses that are in the IPv4 format.

Figure 8:
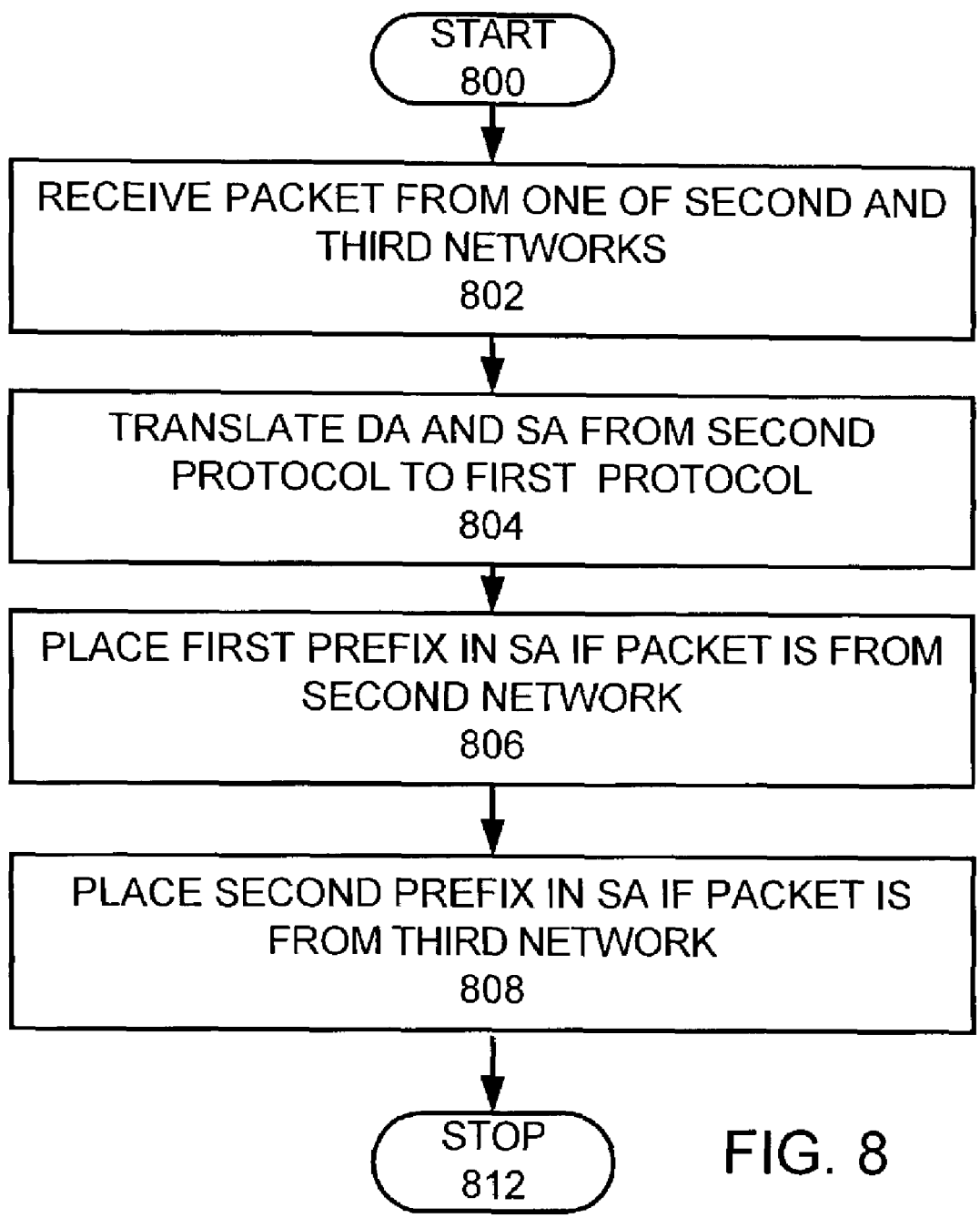
FIG. 8 is a flow chart of the processing of a packet received from either the second network or the third network.

The first device 220 on the third network 205 may send a second packet 412 to the device 230 on the first network. The second packet 412 has a source address of 1.1.1.1 and a destination address of 100.1.1.1. FIG. 8 is a flow chart of the processing of the second packet 412 by the NAT-PT 206. The NAT-PT 206 receives the second packet 412 from the first device on the third network 205 (step 802). The NAT-PT 206 translates the source address of 1.1.1.1 and destination address of 100.1.1.1 from IPv4 to IPv6 (step 804). Part of this translation converts decimal addresses to hexadecimal addresses. Since the second packet is from the third network 205, the NAT-PT knows that the translated second packet is to have a source address prefix of 2002 (step 808), so that source address of the translated second packet is 2002: :0101:0101 and the destination address of the translated second packet is 3FFE: :1.

Figure 5:
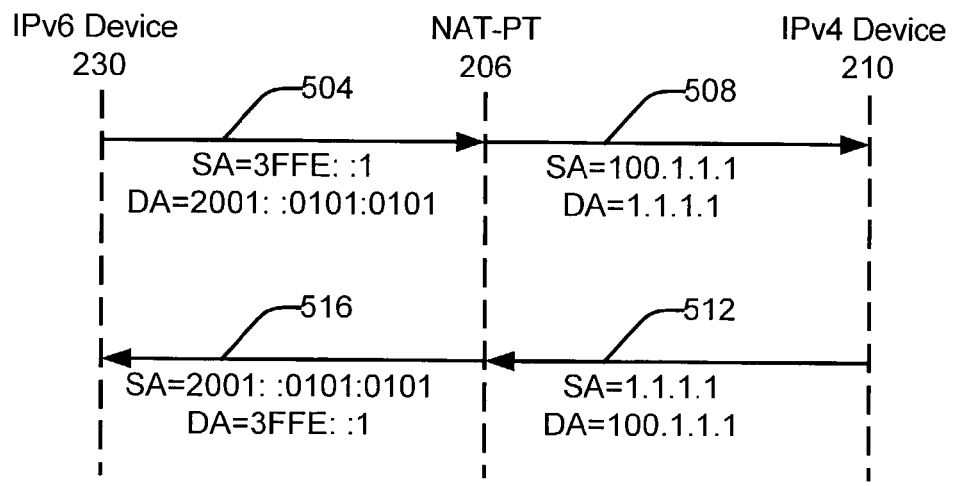
FIG. 5 is a schematic illustration of the IP packets sent during an exchange of IP packets between a device on the first network and a device on the second network.

FIG. 5 is a schematic illustration of the IP packets sent during an exchange of IP packets between the device 230 on the first network 202 and the first device 210 on the second network 204. The device 230 on the first network 202 sends a first IP packet 504, which is passed to the NAT-PT 206. The source address is 3FFE: :1, and the destination address is 2002: :0101:0101. FIG. 7 is a flow chart of the processing of the packet by the NAT-PT. The NAT-PT 206 receives the first packet from the device 230 on the first network 202 (step 702). The NAT-PT 206 translates the source address of 3FFE: :1 and destination address of 2001: :0101 :0101 of the first packet from IPv6 to IPv4 resulting in a source address of 100.1.1.1 and destination address of 1.1.1.1 (step 704). Since the destination address of the first packet had a prefix of 2001, the NAT-PT knows that the translated packet is to be directed to the second network 204 (step 706). The translated first packet 508 goes to the first device 210, which has the address of 1.1.1.1 on the second network. The NAT-PT 206 may have a look up table that indicates that devices on the first network have "100" as the first number in the IPv4 format address and that IPv6 format address with a prefix of 2001 indicates the second network 204 or may use other methods of providing the translation. The resulting translated first packet 508 has source and destination addresses that are in the IPv4 format.

The first device 210 on the second network 204 may send a second packet 512 to the device 230 on the first network. The second packet 512 has a source address of 1.1.1.1 and a destination address of 100.1.1.1. FIG. 8 is a flow chart of the processing of the second packet 512 by the NAT-PT 206. The NAT-PT 206 receives the second packet 512 from the first device on the second network 204 (step 802). The NAT-PT 206 translates the source address of 1.1.1.1 and destination address of 100.1.1.1 from IPv4 to IPv6 (step 804). Since the second packet is from the second network 204, the NAT-PT knows that the translated second packet is to have a source address prefix of 2001 (step 806), so that source address of the translated second packet is 2001: :0101:0101 and the destination address of the translated second packet is 3FFE: :1.

Table 1 illustrates entries in a lookup table that may be used in the above example.

TABLE 1

| Network | IPv4 Prefix | IPv6 Prefix |
|---|---|---|
| First (202) | 100 | Actual IPv6 Address Prefix |
| Second (204) | Actual IPv4 Address Prefix | 2001 |
| Third (205) | Actual IPv4 Address Prefix | 2002 |

Such a lookup table does not need an individual entry for each device. Instead the lookup table has an individual entry for each network. In addition, the NAT-PT needs to only look at the prefix. The translation of the packet address by the NAT-PT would be providing the prefix as determined from the lookup table and then converting the remainder of the address between base 10, for IPv4 formats, and hexadecimal, for IPv6 formats. So the NAT-PT may convert the headers of an IP packet without modifying the information in the payload in the body 312 of the IP packet 300.

The NAT-PT may also be used to accomplish other functions. An example of another function provided by the NAT-PT is described in U.S. patent application Ser. No. 09/920,533, filed Jul. 31, 2001, entitled, "MECHANISMS FOR AVOIDING PROBLEMS ASSOCIATED WITH NETWORK ADDRESS PROTOCOL TRANSLATION", by Daniel C. Biederman.

Generally, the techniques for providing network address translation and protocol translation of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet processing system (e.g., NAT device) may be implemented on a general-purpose network host machine such as a personal computer or workstation. Further, the invention may be at least partially implemented on a card (e.g., an interface card) for a network device or a general-purpose computing device.

Figure 6:
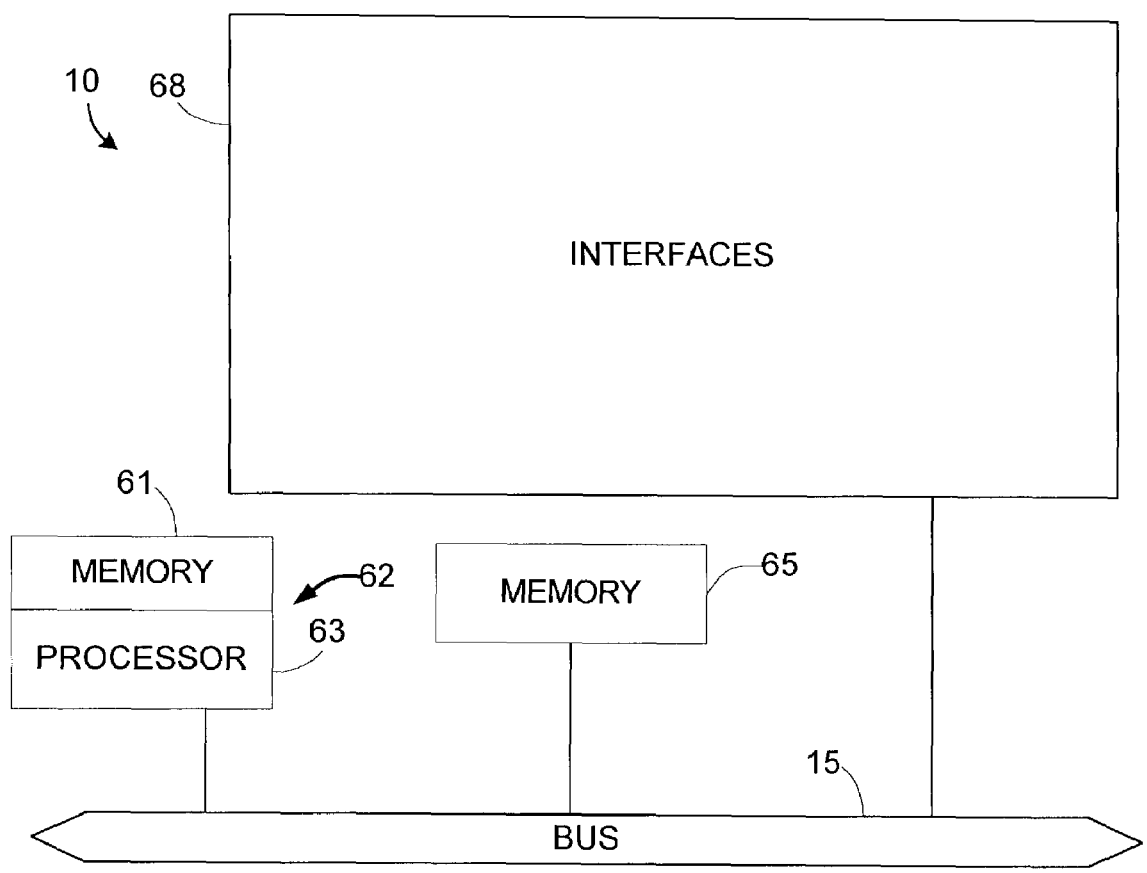
FIG. 6 is a diagrammatic representation of a router in which embodiments of the present invention may be implemented.

Referring now to FIG. 6, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for performing protocol conversions between a first and second protocol (e.g., IPv6 and IPv4), modifying an advertised window size or MSS, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 62 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc., is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets and identifiers to track each flow and the number of such flows, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory (ROM) and random access memory (RAM) devices. The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For example, the techniques of the present invention may be applied to other conversions besides IPv4 to IPv6 conversions. Therefore, the described embodiments should be taken as illustrative and not restrictive, and the invention should not be limited to the details given herein but should be defined by the following claims and their full scope of equivalents. There are alterations, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A method for providing transparent handling of data sent between a first network and at least a second network and a third network, wherein the first network is of a first protocol and the at least second and third networks are of a second protocol and wherein the second and third networks at least partially overlap, comprising:

receiving a packet transmitted from the first network to one of the at least second and third networks wherein the packet has a first address prefix of the first protocol if the packet is directed to the second network and has a second address prefix of the first protocol if the packet is directed to the third network;

translating a destination address of the packet and a source address of the packet from the first protocol to the second protocol, wherein the translating the destination address and source address from the first protocol to the second protocol translates the destination address and source address from a hexadecimal protocol to a decimal protocol, using a lookup table that has an individual entry for each network to provide a prefix, so that the translation determines the prefix and converts the remainder of the address from hexadecimal to base 10, so that a lookup table with an individual entry for each device is not needed;

directing the packet to the second network if the packet has the first address prefix of the first protocol; and directing the packet to the third network if the packet has the second address prefix of the first protocol.

2. The method, as recited in claim 1, further comprising:

receiving a second packet transmitted from one of the second and third networks;

translating a destination address of the second packet and a source address of the second packet from the second protocol to the first protocol;

placing the first address prefix in a source address of the second packet if the second packet is received from the second network;

placing the second address prefix in the source address of the second packet if the second packet is received from the third network; and directing the packet to the first network.

3. The method, as recited in claim 2, wherein the first protocol is IP version 6 and the second protocol is IP version 4.

4. The method, as recited in claim 3, wherein the at least second and third networks at least partially overlap by having devices with identical addresses in the second protocol.

5. The method, as recited in claim 1, wherein the first protocol is IP version 6 and the second protocol is IP version 4.

6. The method, as recited in claim 1, wherein the at least second and third networks at least partially overlap by having devices with identical addresses in the second protocol.

7. The method, as recited in claim 2, wherein the translating the destination address and source address of the second packet from the second protocol to the first protocol converts the destination address and source address from decimal to a hexadecimal.

8. A method for providing transparent handling of data sent between an IPv6 network and at least a first IPv4 network and a second IPv4 network, wherein the first and second IPv4 networks at least partially overlap, comprising:

receiving a packet transmitted from the IPv6 network to a one of the first and second IPv4 networks wherein the packet has a first IPv6 address prefix if the packet is directed to the second network and has a second IPv6 address prefix if the packet is directed to the second IPv4 network;

translating a destination address of the packet and a source address of the packet from an IPv6 protocol to an IPv4 protocol, wherein the translating the destination address and source address from the IPv6 protocol to the IPv4 protocol translates the destination address and source address from a hexadecimal protocol to a decimal protocol, using a lookup table that has an individual entry for each network to provide a prefix, so that the translation determines the prefix and converts the remainder of the address from hexadecimal to base 10, so that a lookup table with an individual entry for each device is not needed;

directing the packet to the first IPv4 network if the packet has the first IPv6 prefix; and directing the packet to the second IPv4 network if the packet has the second IPv6 prefix.

9. The method, as recited in claim 8, further comprising:

receiving a second packet transmitted from one of the first and second IPv4 networks;

converting a destination address of the second packet and a source address of the second packet from decimal to hexadecimal;

placing the first IPv6 prefix in a the converted source address of the second packet if the second packet is received from the first IPv4 network; and placing the second IPv6 in the converted source address of the second packet if the second packet is received from the second IPv4 network.

10. A computer system operable for providing transparent handling of data sent between a first network and at least a second network and a third network, wherein the first network is of a first protocol and the at least second and third networks are of a second protocol and wherein the second and third networks at least partially overlap, comprising:

one or more processors;

one or more memory, wherein at least one of the processors and memory are adapted to:

receive a packet transmitted from the first network to one of the at least second and third networks wherein the packet has a first address prefix of the first protocol if the packet is directed to the second network and has a second address prefix of the first protocol if the packet is directed to the third network;

translate a destination address of the packet and a source address of the packet from the first protocol to the second protocol, wherein the translating the destination address and source address from the first protocol to the second protocol translates the destination address and source address from a hexadecimal protocol to a decimal protocol, using a lookup table that has an individual entry for each network to provide a prefix, so that the translation determines the prefix and converts the remainder of the address from hexadecimal to base 10, so that a lookup table with an individual entry for each device is not needed;

direct the packet to the second network if the packet has the first address prefix of the first protocol; and direct the packet to the third network if the packet has the second address prefix of the first protocol.

11. The computer system, as recited in claim 10, wherein the processors and memory are further adapted to:

receive a second packet transmitted from one of the second and third networks;

translate a destination address of the second packet and a source address of the second packet from the second protocol to the first protocol;

place the first address prefix in a source address of the second packet if the second packet is received from the second network;

place the second address prefix in the source address of the second packet if the second packet is received from the third network; and direct the packet to the first network.

12. The computer system, as recited in claim 11, wherein the first protocol is IP version 6 and the second protocol is IP version 4.

13. The computer system, as recited in claim 12, wherein the at least second and third networks at least partially overlap by having devices with identical addresses in the second protocol.

14. The computer system, as recited in claim 12, wherein when the destination address and source address of the second packet are translated from the second protocol to the first protocol the destination address and source address are converted from decimal to hexadecimal.

15. A computer program volatile or non-volatile media for providing transparent handling of data sent between a first network and at least a second network and a third network, wherein the first network is of a first protocol and the at least second and third networks are of a second protocol and wherein the second and third networks at least partially overlap, comprising:

at least one computer readable medium;

computer program instructions stored within the at least one computer readable volatile or non-volatile media configured to:

receive a packet transmitted from the first network to one of the at least second and third networks wherein the packet has a first address prefix of the first protocol if the packet is directed to the second network and has a second address prefix of the first protocol if the packet is directed to the third network;

translate a destination address of the packet and a source address of the packet from the first protocol to the second protocol, wherein the translating the destination address and source address from the first protocol to the second protocol translates the destination address and source address from a hexadecimal protocol to a decimal protocol, using a lookup table that has an individual entry for each network to provide a prefix, so that the translation determines the prefix and converts the remainder of the address from hexadecimal to base 10, so that a lookup table with an individual entry for each device is not needed;

direct the packet to the second network if the packet has the first address prefix of the first protocol; and direct the packet to the third network if the packet has the second address prefix of the first protocol.

16. The computer program volatile or non-volatile media, as recited in claim 15, wherein the computer instructions are further configured to:
  receive a second packet transmitted from one of the second and third networks;
  translate a destination address of the second packet and a source address of the second packet from the second protocol to the first protocol;
  place the first address prefix in a source address of the second packet if the second packet is received from the second network;
  place the second address prefix in the source address of the second packet if the second packet is received from the third network; and
  direct the packet to the first network.

17. The computer program volatile or non-volatile media, as recited in claim 16, wherein the first protocol is IP version 6 and the second protocol is IP version 4.

18. The computer program volatile or non-volatile media, as recited in claim 17, wherein the at least second and third networks at least partially overlap by having devices with identical addresses in the second protocol.

19. The computer program volatile or non-volatile media, as recited in claim 17, wherein when the destination address of the second packet and source address of the second packet are translated from the second protocol to the first protocol, the destination address and source address are converted from decimal to hexadecimal.

20. An apparatus for providing transparent handling of data sent between a first network and at least a second network and a third network, wherein the first network is of a first protocol and the at least second and third networks are of a second protocol and wherein the second and third networks at least partially overlap, comprising:
  means for receiving a packet transmitted from the first network to one of the at least second and third networks wherein the packet has a first address prefix of the first protocol if the packet is directed to the second network and has a second address prefix of the first protocol if the packet is directed to the third network;
  means for translating a destination address of the packet and a source address of the packet from the first protocol to the second protocol, wherein the translating the destination address and source address from the first protocol to the second protocol translates the destination address and source address from a hexadecimal protocol to a decimal protocol, using a lookup table that has an individual entry for each network to provide a prefix, so that the translation determines the prefix and converts the remainder of the address from hexadecimal to base 10, so that a lookup table with an individual entry for each device is not needed;
  means for directing the packet to the second network if the packet has the first address prefix of the first protocol; and
  means for directing the packet to the third network if the packet has the second address prefix of the first protocol.

21. The apparatus, as recited in claim 20, further comprising:
  means for receiving a second packet transmitted from one of the second and third networks;
  means for converting a destination address of the second packet and a source address of the second packet from decimal to hexadecimal;
  means for placing the first address prefix in the converted source address of the second packet if the second packet is received from the second network;
  means for placing the second address prefix in the converted source address of the second packet if the second packet is received from the third network; and
  means for directing the packet to the first network.

22. The apparatus, as recited in claim 21, wherein the first protocol is IP version 6 and the second protocol is IP version 4.

23. The apparatus, as recited in claim 22, wherein the at least second and third networks at least partially overlap by having devices with identical addresses in the second protocol.

* * * * *